United States Patent
Leiva et al.

(10) Patent No.: US 10,408,290 B2
(45) Date of Patent: Sep. 10, 2019

(54) INSULATED TORQUE PLATE FOOT ASSEMBLY

(71) Applicant: GOODRICH CORPORATION, Charlotte, NC (US)

(72) Inventors: Orly Leiva, Miamisburg, OH (US); Karol Stras, Jelenia Gora (PL); Tomasz Murawski, Ul Skodowskiej (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/892,175

(22) Filed: Feb. 8, 2018

(65) Prior Publication Data
US 2019/0242447 A1 Aug. 8, 2019

(51) Int. Cl.
| | | |
|---|---|---|
| *F16D 55/36* | (2006.01) | |
| *F16D 65/00* | (2006.01) | |
| *B64C 25/42* | (2006.01) | |
| *F16D 55/00* | (2006.01) | |
| *F16D 55/24* | (2006.01) | |

(52) U.S. Cl.
CPC .......... *F16D 65/0056* (2013.01); *B64C 25/42* (2013.01); *F16D 55/24* (2013.01); *F16D 2055/0008* (2013.01)

(58) Field of Classification Search
CPC ... F16D 2065/785; F16D 55/36; F16C 19/525
See application file for complete search history.

(56) References Cited

U.S. PATENT DOCUMENTS

| | | | | | |
|---|---|---|---|---|---|
| 2,714,538 | A | * | 8/1955 | Hornbostel | ........... F16C 19/525 29/525 |
| 3,357,519 | A | * | 12/1967 | Black | ...................... B64C 25/42 188/18 A |
| 3,374,308 | A | * | 3/1968 | Haas | ........................ F16L 7/00 138/113 |

(Continued)

FOREIGN PATENT DOCUMENTS

| | | |
|---|---|---|
| WO | 0555822 | 8/1993 |
| WO | 9501271 | 1/1995 |

(Continued)

OTHER PUBLICATIONS

European Search Report, European Search Report dated Jul. 9, 2019 in Application No. 19155356.9.

*Primary Examiner* — Bradley T King
(74) *Attorney, Agent, or Firm* — Snell & Wilmer, L.L.P.

(57) ABSTRACT

A insulated torque plate foot assembly may comprise torque plate integral to a torque tube, a bushing, and an insulating bushing having a cylindrical structure comprising an inboard face, an inner diameter, an outer diameter, and an outboard face, wherein the insulating bushing coupled to the bushing and the torque plate and disposed between the torque plate and the bushing. The outer diameter may further comprise a first plurality of grooves, cut inward from the outer diameter toward the inner diameter, defining a first plurality of lands. The inner diameter may further comprise a second plurality of grooves, cut outward from the inner diameter toward the outer diameter, defining a second plurality of lands.

12 Claims, 9 Drawing Sheets

(56) References Cited

U.S. PATENT DOCUMENTS

| | | | | |
|---|---|---|---|---|
| 5,062,503 A | * | 11/1991 | Black | F16D 55/36 |
| | | | | 188/264 G |
| 5,255,761 A | * | 10/1993 | Zaremsky | B60T 1/065 |
| | | | | 188/18 A |
| 5,402,865 A | * | 4/1995 | Harker | B60T 1/065 |
| | | | | 188/71.5 |
| 5,540,305 A | * | 7/1996 | Hammond | F16D 55/40 |
| | | | | 188/18 A |
| 5,862,890 A | * | 1/1999 | Long | F16D 55/36 |
| | | | | 188/71.5 |
| 6,003,641 A | | 12/1999 | Boehringer | |
| 7,637,667 B1 | * | 12/2009 | Schaub | B62D 1/16 |
| | | | | 384/536 |
| 9,611,887 B2 | * | 4/2017 | Churchley | F16C 35/077 |
| 2013/0146409 A1 | * | 6/2013 | Boyle | F16D 55/227 |
| | | | | 188/361 |

FOREIGN PATENT DOCUMENTS

| | | |
|---|---|---|
| WO | 9737149 | 10/1997 |
| WO | 2007118254 | 10/2007 |

* cited by examiner

INSULATED TORQUE PLATE FOOT ASSEMBLY

FIELD

The disclosure relates generally to aircraft brake systems and aircraft brake components.

BACKGROUND

Aircraft often include one or more landing gear that comprise one or more wheels. A braking system is coupled to the wheel(s) in order to decelerate or park the aircraft. Aircraft braking on landing tends to generate significant heat which tends to damage unprotected brake system components. Heat may tend to transfer between brake system components to a wheel axle, tending thereby to fatigue and damage the wheel axle.

SUMMARY

In various embodiments the present disclosure provides insulated torque plate foot assembly may comprise a torque plate integral to a torque tube, a bushing, and an insulating bushing having a cylindrical structure comprising an inboard face, an inner diameter, an outer diameter, and an outboard face, wherein the insulating bushing coupled to the bushing and the torque plate, the insulating bushing disposed between the torque plate and the bushing.

In various embodiments, the outer diameter further comprises a first plurality of grooves, cut inward from the outer diameter toward the inner diameter, defining a first plurality of lands. In various embodiments, the inner diameter further comprises a second plurality of grooves, cut outward from the inner diameter toward the outer diameter, defining a second plurality of lands. In various embodiments, at least one of the inboard face or the outboard face comprises a first plurality of bumpers. In various embodiments, at least one of the outboard face or the outboard face comprises a first plurality of bumpers. In various embodiments, at least one of the first plurality of lands or the second plurality of lands further comprise a first contact surface having one of a curved radial cross section, an angular radial cross section, or a multi-angular radial cross section, or a rectangular radial cross section. In various embodiments, the first plurality of bumpers comprises a first contact surface having one of a curved radial cross section, an angular radial cross section, or a multi-angular radial cross section, or a rectangular radial cross section. In various embodiments, the first contact surface contacts at least one of the bushing or the torque plate at a radial contact interface, wherein a contact area of the radial contact interface inhibits the conductive transfer of heat energy through the insulating bushing. In various embodiments, the first plurality of bumpers further comprises a second contact surface having one of a curved radial cross section, an angular radial cross section, a multi-angular radial cross section, or a rectangular radial cross section, wherein the second contact surface contacts at least one of a first axial retention feature of the torque plate or a second axial retention feature of the bushing at an axial contact interface, wherein a contact area of the axial contact interface inhibits the conductive transfer of heat energy through the insulating bushing. In various embodiments, wherein the insulated bushing comprises at least one of a polymer, an epoxy resin, a phenolic resin, a laminate, a PFTE, or a polyethylene.

In various embodiments, the present disclosure provides a brake assembly for an axle comprising a brake rotor, and an insulated torque plate foot assembly, comprising a torque plate integral to a torque tube, wherein the torque tube is coupled to a brake stator, a bushing, and an insulating bushing having a cylindrical structure comprising an inboard face, an inner diameter, an outer diameter, and an outboard face, wherein the insulating bushing coupled to the bushing and the torque plate, the insulating bushing disposed between the torque plate and the bushing.

In various embodiments, the outer diameter further comprises a first plurality of grooves, cut inward from the outer diameter toward the inner diameter, defining a first plurality of lands. In various embodiments, the inner diameter further comprises a second plurality of grooves, cut outward from the inner diameter toward the outer diameter, defining a second plurality of lands. In various embodiments, at least one of the inboard face or the outboard face comprises a first plurality of bumpers. In various embodiments, at least one of the inboard face or the outboard face comprises a first plurality of bumpers. In various embodiments, at least one of the first plurality of lands or the second plurality of lands further comprise a first contact surface having one of a curved radial cross section, an angular radial cross section, or a multi-angular radial cross section, or a rectangular radial cross section. In various embodiments, the first plurality of bumpers comprises a first contact surface having one of a curved radial cross section, an angular radial cross section, or a multi-angular radial cross section, or a rectangular radial cross section. In various embodiments, the first contact surface contacts at least one of the bushing or the torque plate at a radial contact interface, wherein a contact area of the radial contact interface inhibits the conductive transfer of heat energy through the insulating bushing. In various embodiments, the first plurality of bumpers further comprises a second contact surface having one of a curved radial cross section, an angular radial cross section, a multi-angular radial cross section, or a rectangular radial cross section, wherein the second contact surface contacts at least one of a first axial retention feature of the torque plate or a second axial retention feature of the bushing at a radial contact interface, wherein a contact area of the axial contact interface inhibits the conductive transfer of heat energy through the insulating bushing.

In various embodiments, the present disclosure provides a method of manufacturing insulated torque plate foot assembly, the method comprising forming an insulating bushing having a cylindrical structure comprising an inboard face, an inner diameter, an outer diameter, and an outboard face, wherein at least one of the inner diameter or the outer diameter comprises a plurality of grooves defining a plurality of lands, and wherein at least one of the inboard face or the outboard face comprises a plurality of bumpers, disposing the insulating bushing between a torque plate and a bushing, radially inward of the torque plate and radially outward of the bushing, and contacting the inboard face with a first axial contact interface, contacting the outboard face with a second axial contact interface, contacting the inner diameter with a first radial contact interface, and contacting the outer diameter with a second radial contact interface.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
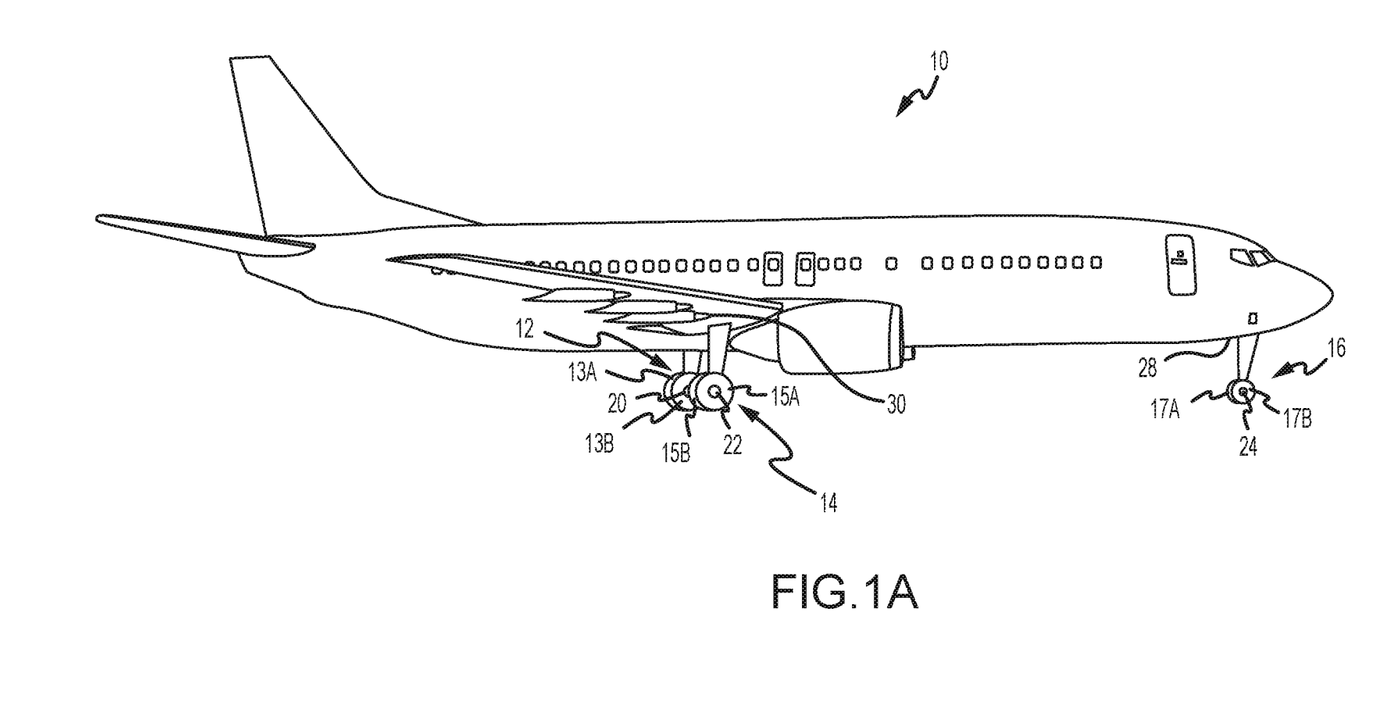
FIG. 1A illustrates an aircraft having a brake system comprising an insulated torque plate foot assembly, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Such brake systems of the aircraft 10 typically comprise a collection of assemblies, subsystems, and/or units that produce output signals for controlling the braking force and/or torque applied at one or more of the wheels 13A, 13B, 15A, 15B, 17A, 17B. Such brake systems typically communicate with the brakes of the left main landing gear 12, right main landing gear 14, and/or nose landing gear 16, and each brake is typically mounted to each wheel 13A, 13B, 15A, 15B, 17A, 17B in order to apply and release braking forces thereon. In various embodiments, the brakes of the aircraft 10 further include a non-rotatable wheel support, the wheels 13A, 13B, 15A, 15B, 17A, 17B mounted to the wheel support for rotation, and a brake disk stack.

Figure 1B:
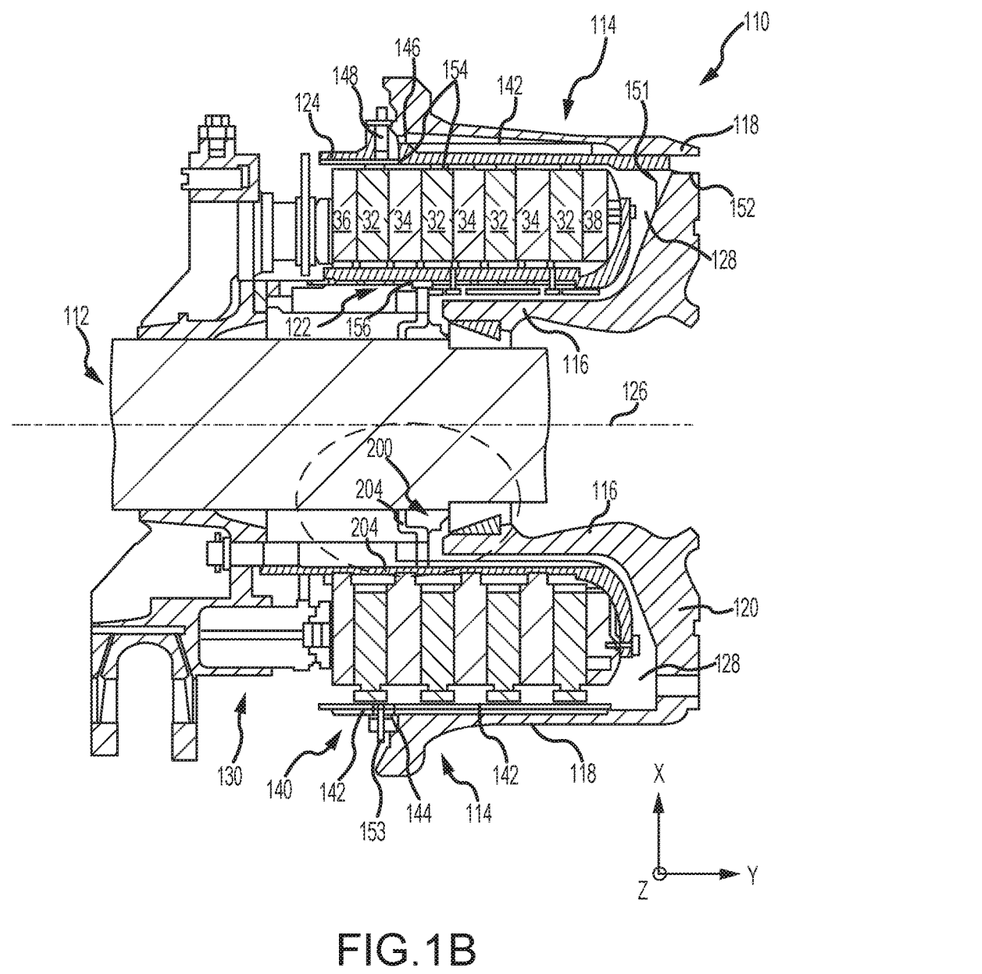
FIG. 1B illustrates a brake assembly comprising an insulated torque plate foot assembly, in accordance with various embodiments.

Referring now to FIG. 1B, a brake assembly 110 having an insulated torque plate foot assembly 200 (area highlighted by dashed lines shown in detail by FIG. 2 below) is located on the aircraft 10 of FIG. 1A, in accordance with various embodiments. XY-axes are provided to indicate the axial (y-direction) and radial (x-direction) directions. The brake assembly 110 typically comprises a bogie axle 112, a wheel 114 (e.g., the wheels 13A, 13B, 15A, 15B, 17A, 17B of FIG. 1A) including a hub 116 and wheel well 118, a web 120, a torque take-out assembly 122 comprising an insulated torque plate foot assembly 200, one or more torque bars 124, a wheel rotational axis 126, a wheel well recess 128, an actuator 130, multiple brake rotors 32, multiple brake stators 34, a pressure plate 36, an end plate 38, a laminated heat shield 140 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) are disposed in the wheel well recess 128 of the wheel well 118. The brake rotors 32 are typically secured to the torque bars 124 for rotating with the wheel 114, while the brake stators 34 are typically engaged with the torque take-out assembly 122. At least one actuator 130 is typically operable to compress the interleaved brake rotors 32 and brake stators 34 for stopping the aircraft 10 of FIG. 1A. In the embodiment of FIG. 1B, the actuator 130 is shown as a hydraulically actuated piston. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from contact between the brake disks while braking the aircraft 10 of FIG. 1A.

Figure 2:
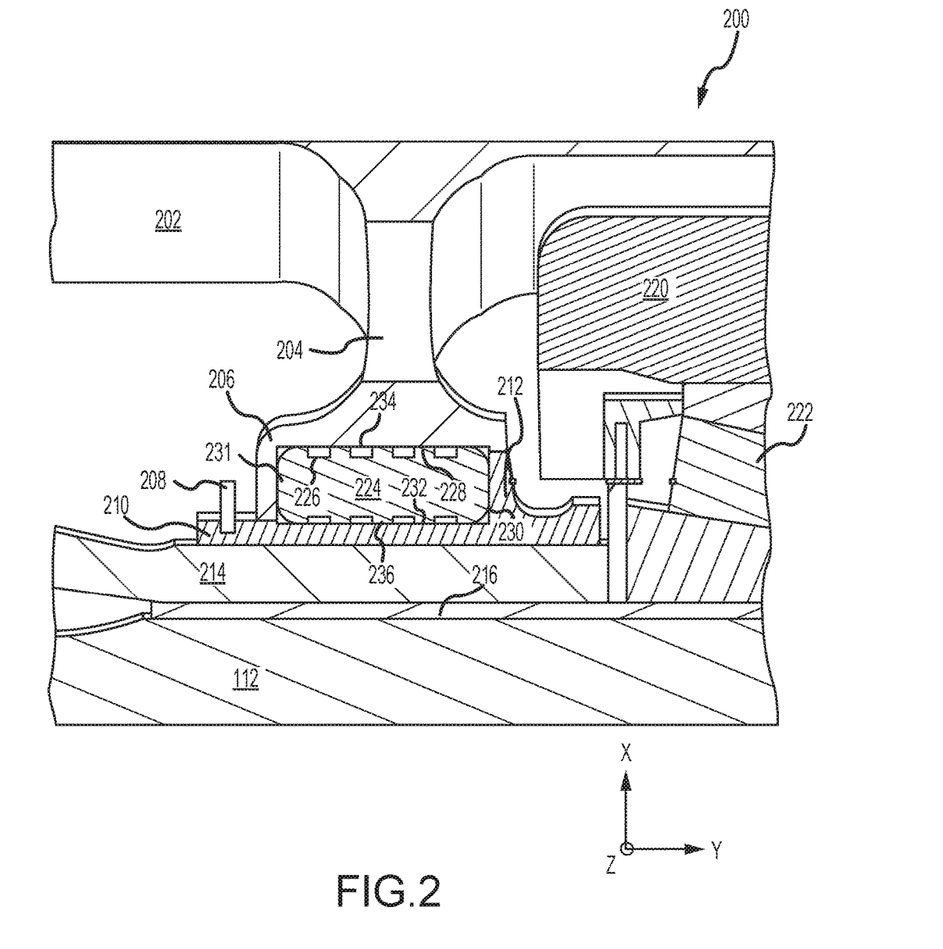
FIG. 2 illustrates a detailed view in axial cross section of an insulated torque plate foot assembly, in accordance with various embodiments.

According to various embodiments and with continued reference to FIG. 1B, FIG. 2 illustrates a detailed view (area highlighted by dashed lines in FIG. 1B) of an insulated torque plate foot assembly 200 in radial cross section (through x-y plane) with respect to axis 126 of axle 112. Insulated torque plate foot assembly 200 comprises a torque plate 204 integral to a torque tube 202 and having an insulating bushing 224 defining a radial contact interface 234 between the torque plate 204 and the insulating bushing 224 at an outer diameter of the insulating bushing 224 and a contact interface 236 between the bushing 210 and an inner diameter of the insulating bushing 224. In various embodiments, torque plate 204 may comprise a first axial retention feature 206 and bushing 210 may comprise a second axial retention feature 212 defining an axial interface 230 between the bushing 210 and the insulating bushing 224 and an axial interface 231 between the torque plate 204 and the insulating bushing 224. In various embodiments, an interference between first axial retention feature 206 and insulating bushing 224 and between second axial retention feature 212 and insulating bushing 224 may tend to retain insulating bushing 224 axially with respect to axle 112. In various embodiments, a spring ring 208 may couple bushing 210 to a first axle sleeve 214. In various embodiments, first axle sleeve 214 may be coupled to a second axle sleeve 216 in contact with axle 112. In various embodiments, a wheel 220 may be coupled about second axle sleeve 216 at bearing 222.

With continued reference to FIG. 2 and in various embodiments, insulating bushing 224 may comprise a cylindrical structure having an inner diameter proximate bushing 210 and an outer diameter proximate torque plate 204 and having an inboard face proximate first axial retention feature 206 and an outboard face proximate second axial retention feature 212. In various embodiments, a plurality of grooves 226 may be cut inward from the outer diameter toward the inner diameter and inward from the inner diameter toward the outer diameter. In this regard, the grooves may define a plurality of lands 228 in contact with torque plate 204 at the radial contact interface 234 of the outer diameter and lands 232 in contact with the bushing 210 at radial contact interface 236 of the inner diameter. In this regard, a contact area at radial contact interface 234 between insulating bushing 224 and torque plate 204 and at radial contact interface 236 between insulating bushing 224 and bushing 210 may be reduced, tending thereby to inhibit the conductive transfer of heat energy through insulating bushing 224 and, in response, tending to inhibit heat flow between the torque plate 204 and the bushing 210.

Figure 3A:
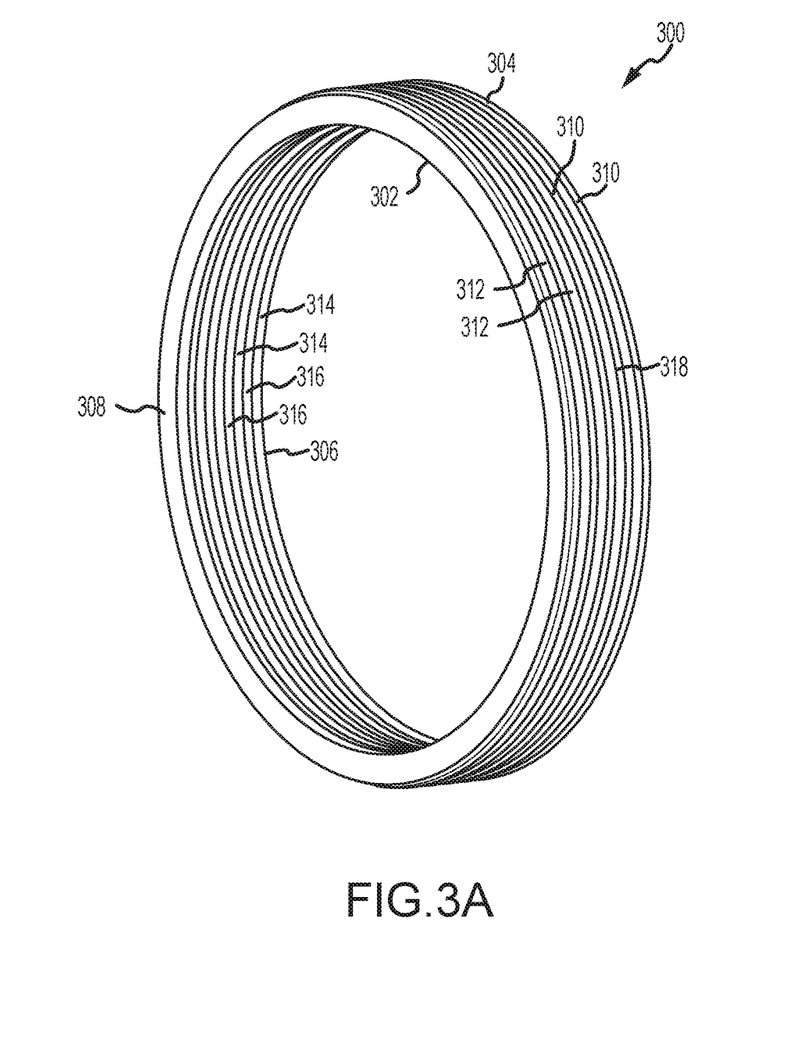
FIG. 3A illustrates an insulating bushing, in accordance with various embodiments.
Figure 3B:
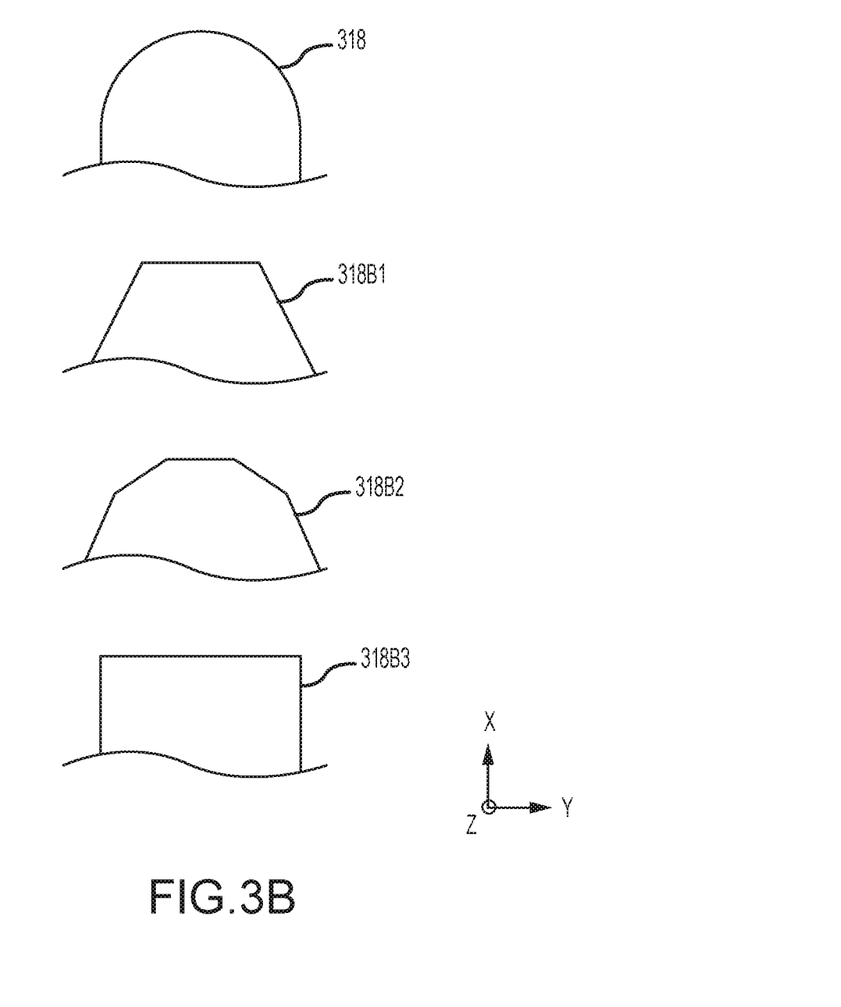
FIG. 3B illustrates a contact surface of an insulating bushing in cross section through the x-y plane, in accordance with various embodiments.

With additional reference to FIGS. 3A and 3B, insulating bushing 300 comprises various features, materials, geometries, construction, manufacturing techniques, and/or internal components similar to insulating bushing 224. Insulating bushing 300 may comprise a cylindrical structure having an inner diameter 302, an outer diameter 304, an inboard face 308 and an outboard face 306. A plurality of grooves 312 run circumferentially about outer diameter 304 and define a plurality of lands 310 at the outer diameter. In various embodiments, a plurality of grooves 316 run circumferentially about inner diameter 302 and define a plurality of lands 314 at the inner diameter. In various embodiments, lands 314 and lands 310 may comprise a contact surface 318 having a curved radial cross section and, in this regard, the contact area at a contact interface, such as contact interface 234, between an insulating bushing, such as insulating bushing 300, and a torque plate, such as torque plate 204, may be further reduced by a reduction in axial cross section area between a base of the lands and the contact surface 318, tending thereby to inhibit the conductive transfer of heat energy into insulating bushing 300. In various embodiments FIG. 3B illustrates a contact surface of an insulating bushing in a cross section through the x-y plane, a contact surface such as contact surface 318 of a land may comprise an angular radial cross section 318B1, or a multi-angular radial cross section 318B2, or a rectangular radial cross section 318B3 (such as insulating bushing 224 of FIG. 2).

Figure 4A:
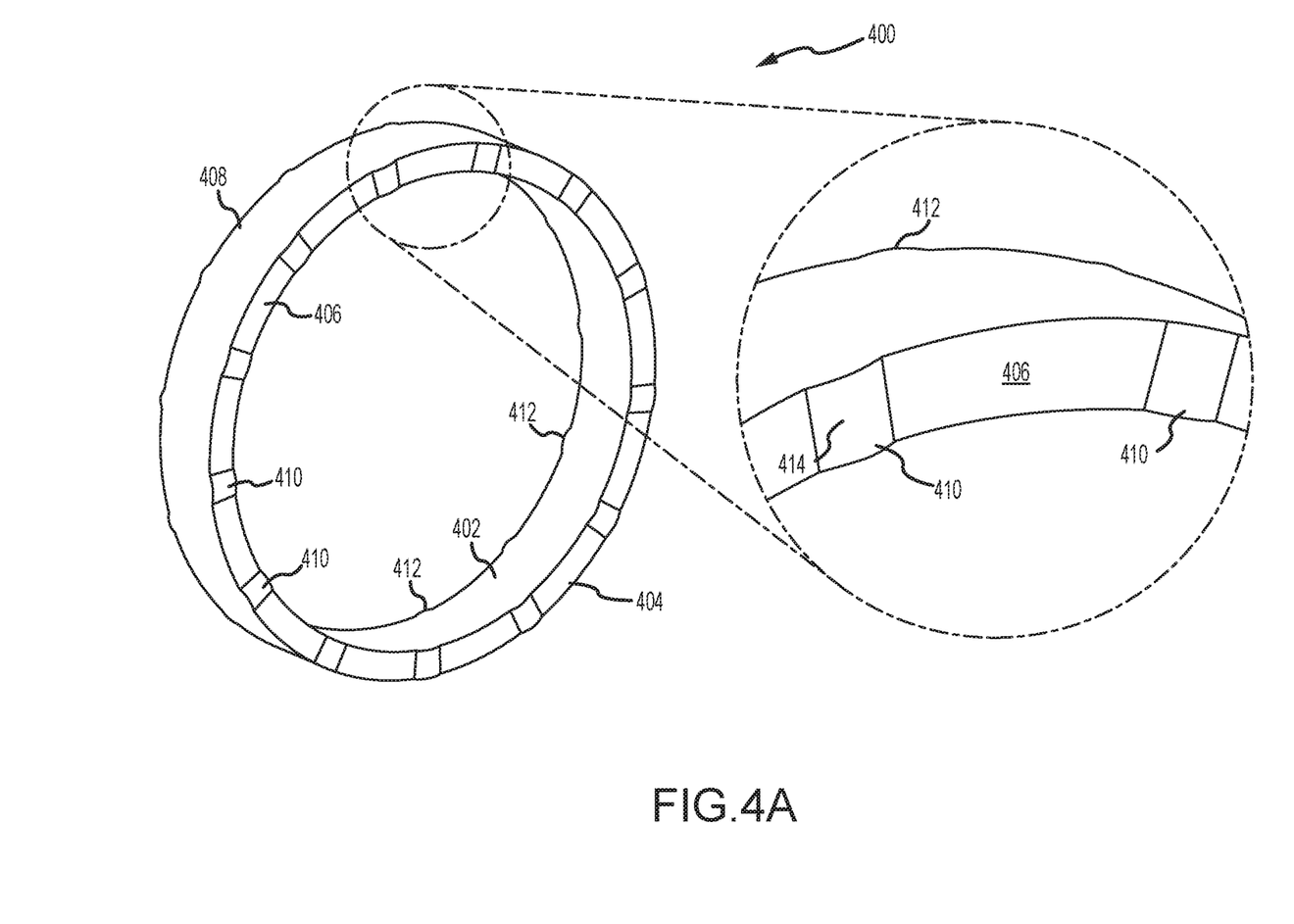
FIG. 4A illustrates an insulating bushing, in accordance with various embodiments.
Figure 4B:
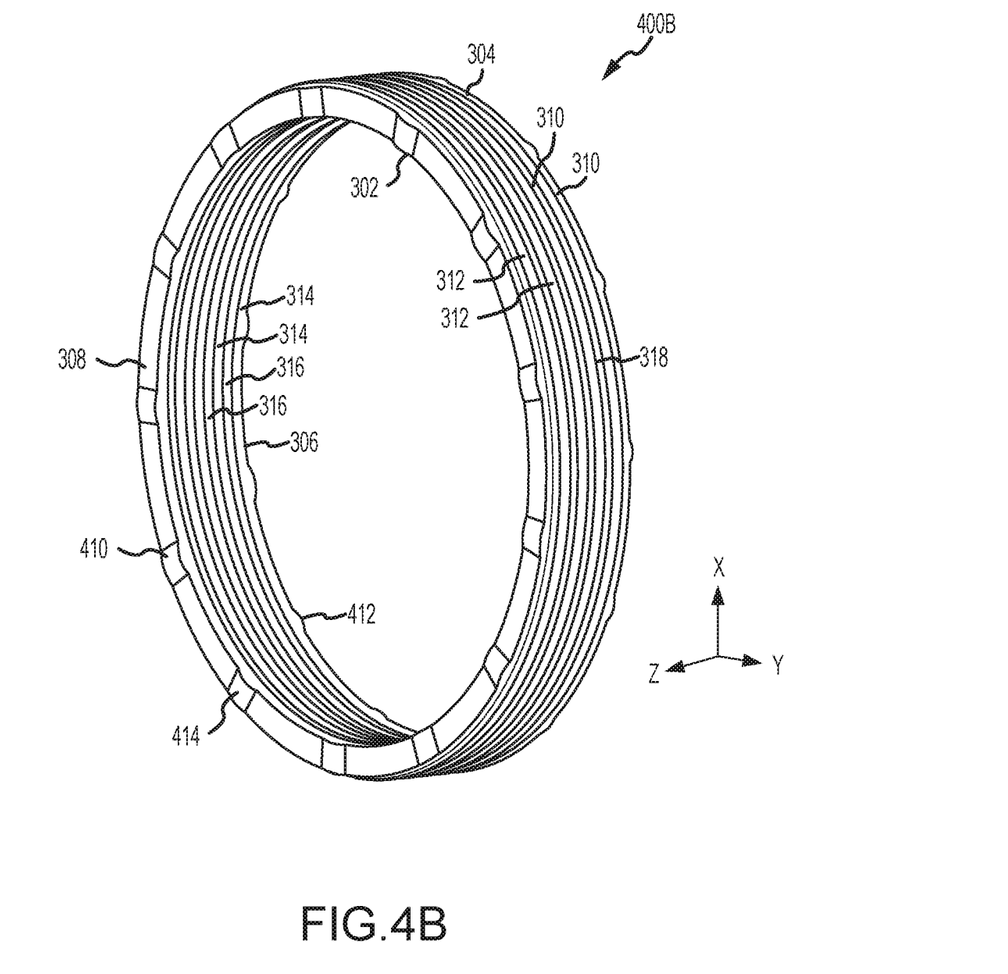
FIG. 4B illustrates an insulating bushing, in accordance with various embodiments.
Figure 4C:
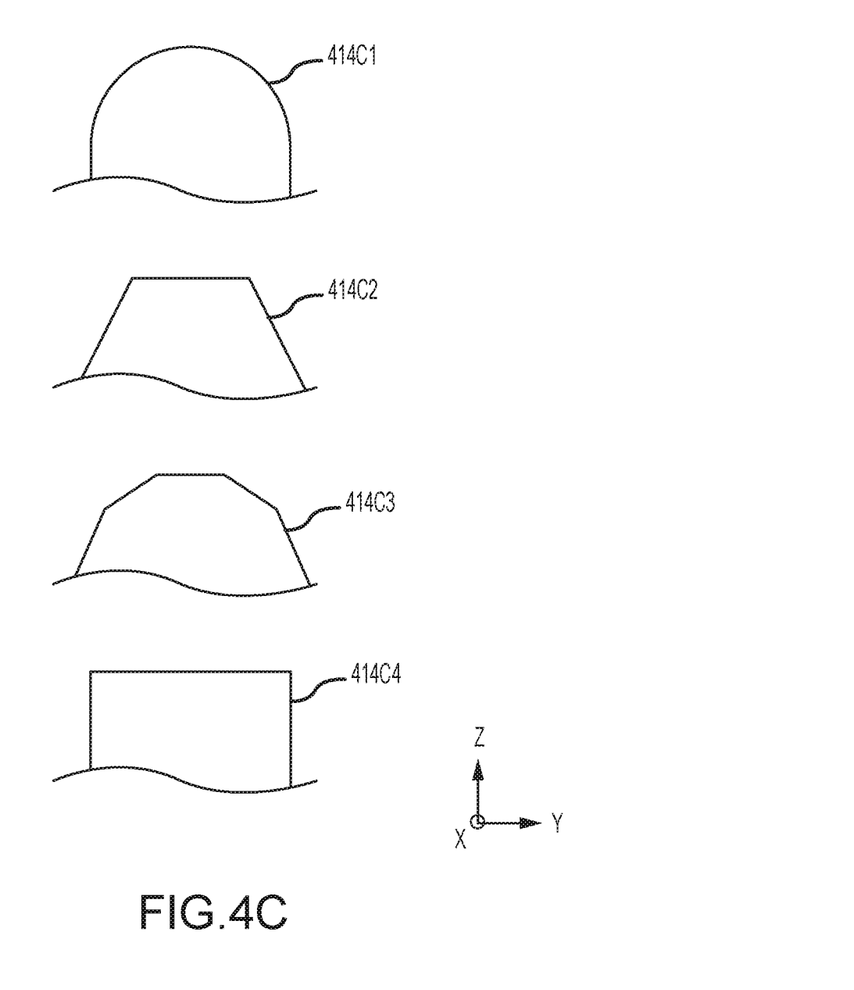
FIG. 4C illustrates a contact surface of an insulating bushing in cross section through the x-z plane, in accordance with various embodiments.

With additional reference to FIGS. 4A, 4B, and 4C, insulating bushing 400 may comprise a cylindrical structure having an inner diameter 402, an outer diameter 404, an inboard face 408 and an outboard face 406. A plurality of bumpers 410 are located circumferentially about outboard face 406 and extend from outboard face 406. In various embodiments bumpers 412 may be located circumferentially about inboard face 408 and may extend from inboard face 408. In various embodiments, bumpers 410 and bumpers 412 may comprise a contact surface 414 having one of a curved cross section 414C1, an angular cross section 414C2, a multi-angular cross section 414C3, or a rectangular cross section 414C4 and, in this regard a contact area at an axial contact interface, such as axial contact interface 231, between insulating bushing 400 and a torque plate, such as torque plate 204, and a contact area at an axial contact interface, such as axial contact interface 230, between insulating bushing 400 and a bushing, such as bushing 210, may be reduced, tending thereby to inhibit the conductive transfer of heat energy into insulating bushing 400.

In various embodiments and with reference to FIG. 4B, an insulated bushing 400B comprises various features, materials, geometries, construction, manufacturing techniques, and/or internal components similar to insulating bushing 300 and insulating bushing 400. In the interest of clarity, like elements are illustrated with like numbers. Insulating bushing 400B comprises a plurality of bumpers located about an inboard and outboard face and a plurality of grooves circumferentially about an inner and an outer diameter, the plurality of grooves defining a plurality of lands therebetween.

In various embodiments, an insulating bushing may comprise one of a polymer, an epoxy resin, a phenolic resin, a laminate, a PFTE, or a polyethylene. In various embodiments, an insulating bushing may comprise a combination of lands, grooves, and bumpers tending thereby to reduce a contact area at an axial contact interface and a contact area at a radial contact interface.

Figure 5:
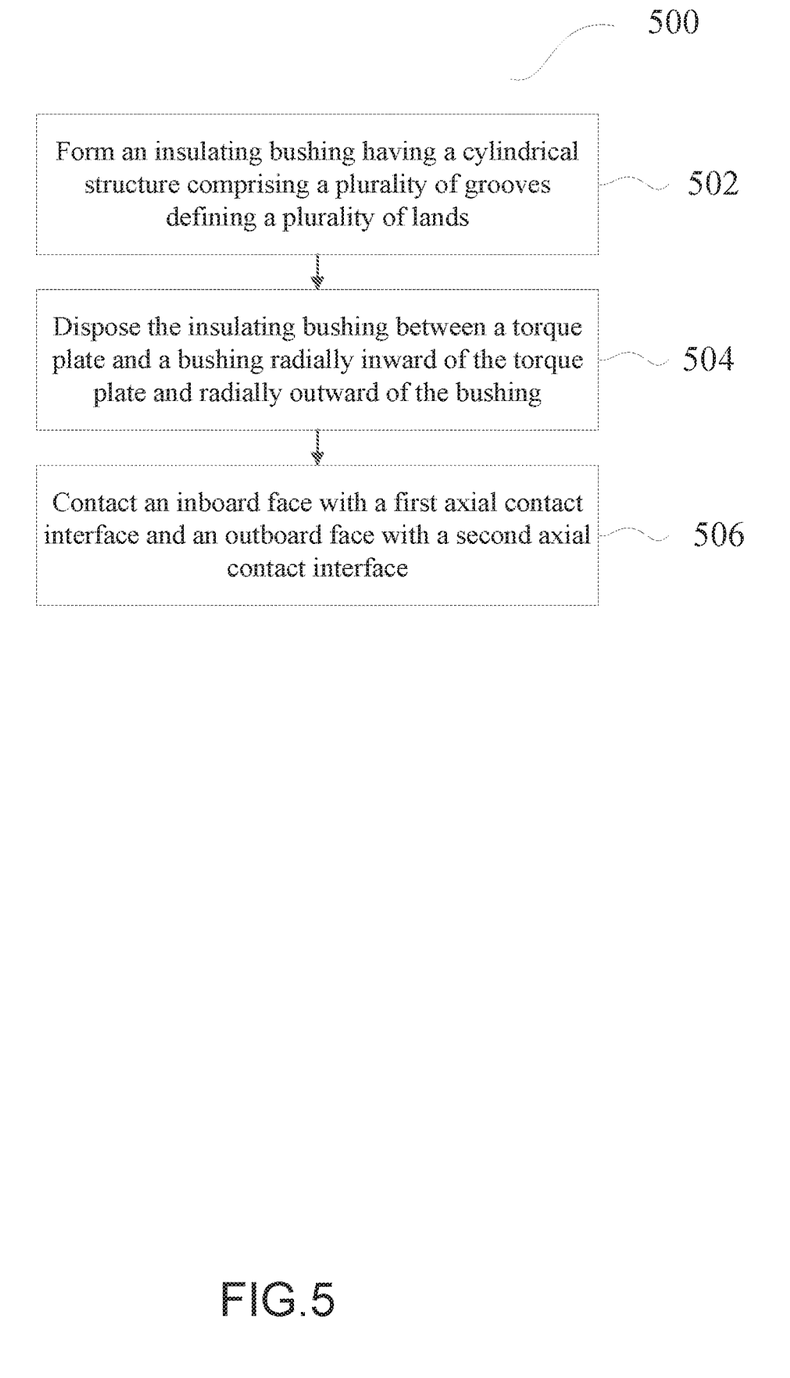
FIG. 5 illustrates a method of manufacturing an insulated torque plate foot assembly, in accordance with various embodiments.

In various embodiments and with reference now to FIG. 5, a method 500 of manufacturing insulated torque plate foot assembly may comprise forming an insulating bushing having a cylindrical structure (step 502) comprising an inboard face, an inner diameter, an outer diameter, and an outboard face, wherein at least one of the inner diameter or the outer diameter comprises a plurality of grooves defining a plurality of lands, and wherein at least one of the inboard face or the outboard face comprises a plurality of bumper; disposing the insulating bushing between a torque plate and a bushing (step 504), radially inward of the torque plate and radially outward of the bushing; and contacting the inboard face with a first axial contact interface, contacting the outboard face with a second axial contact interface, contacting the inner diameter with a first radial contact interface, and contacting the outer diameter with a second radial contact interface (step 506).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An insulated torque plate foot assembly, comprising:
a torque plate integral to a torque tube;
a bushing; and
an insulating bushing having a cylindrical structure comprising an inboard face, an inner diameter, an outer diameter, and an outboard face, wherein the insulating bushing coupled to the bushing and the torque plate, the insulating bushing disposed between the torque plate and the bushing,
wherein the outer diameter further comprises a first plurality of grooves, cut inward from the outer diameter toward the inner diameter, defining a first plurality of lands,
wherein the inner diameter further comprises a second plurality of grooves, cut outward from the inner diameter toward the outer diameter, defining a second plurality of lands,
wherein at least one of the inboard face or the outboard face comprises a first plurality of bumpers.

2. The insulated torque plate foot assembly of claim 1, wherein at least one of the first plurality of lands or the second plurality of lands further comprise a first contact surface having one of a curved radial cross section, an angular radial cross section, a multi-angular radial cross section, or a rectangular radial cross section.

3. The insulated torque plate foot assembly of claim 1, wherein the first plurality of bumpers comprises a first contact surface having one of a curved radial cross section, an angular radial cross section, a multi-angular radial cross section, or a rectangular radial cross section.

4. The insulated torque plate foot assembly of claim 2, wherein the first contact surface contacts at least one of the bushing or the torque plate at a radial contact interface, wherein a contact area of the radial contact interface inhibits the conductive transfer of heat energy through the insulating bushing.

5. The insulated torque plate foot assembly of claim 4, wherein the first plurality of bumpers further comprises a second contact surface having one of a curved radial cross section, an angular radial cross section, a multi-angular radial cross section, or a rectangular radial cross section, wherein the second contact surface contacts at least one of a first axial retention feature of the torque plate or a second axial retention feature of the bushing at an axial contact interface, wherein a contact area of the axial contact interface inhibits a conductive transfer of heat energy through the insulating bushing.

6. The insulated torque plate foot assembly of claim 1, wherein the insulated bushing comprises at least one of a polymer, an epoxy resin, a phenolic resin, a laminate, a PFTE, or a polyethylene.

7. A brake assembly for mounting on an axle comprising:
a brake rotor; and
an insulated torque plate foot assembly, comprising:
a torque plate integral to a torque tube, wherein the torque tube is coupled to a brake stator;
a bushing; and
an insulating bushing having a cylindrical structure comprising an inboard face, an inner diameter, an outer diameter, and an outboard face, wherein the insulating bushing is coupled to the bushing and the torque plate, and the insulating bushing is disposed between the torque plate and the bushing,
wherein the outer diameter further comprises a first plurality of grooves, cut inward from the outer diameter toward the inner diameter, defining a first plurality of lands,
wherein the inner diameter further comprises a second plurality of grooves, cut outward from the inner diameter toward the outer diameter, defining a second plurality of lands, wherein at least one of the inboard face or the outboard face comprises a first plurality of bumpers.

8. The brake assembly of claim 7, wherein at least one of the first plurality of lands or the second plurality of lands further comprise a first contact surface having one of a curved radial cross section, an angular radial cross section, a multi-angular radial cross section, or a rectangular radial cross section.

9. The brake assembly of claim 7, wherein the first plurality of bumpers comprises a first contact surface having one of a curved radial cross section, an angular radial cross section, a multi-angular radial cross section, or a rectangular radial cross section.

10. The brake assembly of claim 8, wherein the first contact surface contacts at least one of the bushing or the torque plate at a radial contact interface, wherein a contact area of the radial contact interface inhibits a conductive transfer of heat energy through the insulating bushing.

11. The brake assembly of claim 10, wherein the first plurality of bumpers further comprises a second contact surface having one of a curved radial cross section, an angular radial cross section, a multi-angular radial cross section, or a rectangular radial cross section, wherein the second contact surface contacts at least one of a first axial retention feature of the torque plate or a second axial retention feature of the bushing at a radial contact interface, wherein a contact area of the axial contact interface inhibits the conductive transfer of heat energy through the insulating bushing.

12. A method of manufacturing insulated torque plate foot assembly, the method comprising:
    forming an insulating bushing having a cylindrical structure comprising an inboard face, an inner diameter, an outer diameter, and an outboard face, wherein at least one of the inner diameter or the outer diameter comprises a plurality of grooves defining a plurality of lands, and wherein at least one of the inboard face or the outboard face comprises a plurality of bumpers;
    disposing the insulating bushing between a torque plate and a bushing, radially inward of the torque plate and radially outward of the bushing; and
    contacting the inboard face with a first axial contact interface, contacting the outboard face with a second axial contact interface, contacting the inner diameter with a first radial contact interface, and contacting the outer diameter with a second radial contact interface.

* * * * *